United States Patent
January (10) Patent No.: US 10,406,061 B1
(45) Date of Patent: Sep. 10, 2019

(54) WALKER WITH VOICE-ACTIVATED ILLUMINATION

(71) Applicant: Debora January, Mill Valley, CA (US)

(72) Inventor: Debora January, Mill Valley, CA (US)

( * ) Notice: Subject to any disclaimer, the term of this patent is extended or adjusted under 35 U.S.C. 154(b) by 0 days.

(21) Appl. No.: 16/282,945

(22) Filed: Feb. 22, 2019

(51) Int. Cl.
*A61H 3/00* (2006.01)
*A61H 3/04* (2006.01)
*H02J 7/04* (2006.01)

(52) U.S. Cl.
CPC .................. *A61H 3/04* (2013.01); *H02J 7/04* (2013.01); *A61H 2003/002* (2013.01); *A61H 2003/005* (2013.01); *A61H 2003/046* (2013.01); *A61H 2201/0188* (2013.01); *A61H 2201/5048* (2013.01)

(58) Field of Classification Search
CPC ..... A61H 3/04; A61H 2003/002; A61H 3/008
See application file for complete search history.

(56) References Cited

U.S. PATENT DOCUMENTS

| | | | |
|---|---|---|---|
| 2,316,100 A | 4/1943 | Nelson | |
| D345,855 S | 4/1994 | Greenway | |
| 6,070,603 A | 6/2000 | Politz | |
| 6,108,592 A | 8/2000 | Kurtzberg et al. | |
| 6,296,263 B1 | 10/2001 | Schultz et al. | |
| 7,938,413 B2 | 5/2011 | Anderson | |
| 8,608,183 B2 | 12/2013 | Woo | |
| 8,810,407 B1 | 8/2014 | Nolan et al. | |
| 2007/0193611 A1 | 8/2007 | Gallo | |
| 2008/0174084 A1 | 7/2008 | Gee | |
| 2008/0179850 A1* | 7/2008 | Catelli | A47D 13/04 280/87.051 |
| 2008/0185797 A1* | 8/2008 | Bohn | A61H 3/04 280/7.1 |
| 2015/0173994 A1* | 6/2015 | Chen | A61H 3/04 280/639 |
| 2015/0297439 A1* | 10/2015 | Karlovich | A63B 22/02 280/650 |
| 2017/0014298 A1* | 1/2017 | O'Sullivan | A61H 3/04 |
| 2017/0175997 A1* | 6/2017 | Rosenblum | H05B 37/0236 |
| 2017/0209319 A1* | 7/2017 | Fawcett | A61H 3/04 |
| 2018/0228685 A1* | 8/2018 | Schreier | A61H 3/04 |

* cited by examiner

*Primary Examiner* — Hau V Phan
(74) *Attorney, Agent, or Firm* — Cramer Patent & Design, PLLC; Aaron R. Cramer (57) ABSTRACT

A walker incorporates a folding frame with two (2) rear legs, a center frame, and a front base. At the distal end of each rear leg is a wheel and located at the bottom of the front base leg is a pair of wheels secured about an axle. A seat is removably attached to the frame and can also collapse. The walker also incorporates a voice-activation illumination, a pair of hand grips each disposed at the distal ends of the frame, a rear wheel locking mechanism, a mobile telephone charging port, and a plurality of incidental item holding devices.

20 Claims, 7 Drawing Sheets

WALKER WITH VOICE-ACTIVATED ILLUMINATION

FIELD OF THE INVENTION

The present invention relates generally to the field of walkers.

BACKGROUND OF THE INVENTION

Handicapped walkers are used every day by the elderly, the disabled, and those recovering from surgery or illness. They are a godsend for restoring mobility and independence while ensuring the user's safety. However, their aesthetic qualities are drab, dull, and serve to constantly reinforce the disabled and/or elderly lifestyle their users face daily.

While attempts can be made to change their color, or add on brightly colored and cheerful accessories, they still present an unsightly appearance that represents drudgery to the user. Additionally, as technology in other parts of our lives is rapidly changing, walkers have remained untouched by fundamental improvements for generations. Finally, as many users of walkers suffer from diminished eyesight, especially in dark or dimly lit rooms, there is in an important urgency to provide auxiliary task lighting to prevent trips and falls.

Accordingly, there exists a need for a means by which a walker can be provided with overall improvements and updates that address the above concerns. The development of the walker with voice-activated illumination 10 fulfills this need.

SUMMARY OF THE INVENTION

The principles of the present invention provide for a walker with voice-activated illumination (herein also described as the "WVAI"), which has a main central frame with a pair of rearwardly-projecting support arms. The main central frame is provided with a main front base while the pair of support arms are each provided with an independent rear support leg. The main front base is also provided with a pair of front wheels. The rear support legs are each attached to a foot that is provided with a respective rear wheel for a total of four wheels. The main central frame is adjustable along a travel path through use of a plurality of first spring pin adjustable rods which in turn is actuated through use of a first release pushbutton.

Each of the two rear support legs with respect to the foot are adjustable along a travel path through use of two second spring pin adjustable rods and are controlled by two second release pushbuttons. The upper portion of the main central frame is provided with a pair of two third spring pin adjustable rods. Each spring pin adjustable rod is controlled by a respective third release pushbutton to provide for travel of each the support arm along a fourth travel path.

In addition to the above, located upon an opposing one of the support arms is a personal electronic device charging port, a light control switch, and a microphone is a cup holder to hold a beverage cup, a water bottle or a similar cylindrical container. Furthermore, located upon the support arm is a step counter display, a step counter reset button, a duress pushbutton, a digital clock display, and a plurality of digital clock set switches, the step counter display is used to count steps of the user while enlisting aid of the WVAI.

The WVAI also comprises a seat base which is supported via the main central frame and the support arms via a folding support system. The seat base includes a lateral support along and attached to a bottom surface which is adjacent a rearward perimeter edge of the seat base. A memory foam pad is provided atop the seat base. The seat base and the memory foam pad are adjustable in nature with respect to the seating height position and are supported by a pair of front angular supports and a pair of rear hanging rods.

A pair of longitudinal supports are also provided and are parallel with each other while being attached to a bottom surface adjacent to perimeter side edges of the seat base. The pair of longitudinal supports have a first end each attached to the lateral support and a second end. The second ends of the longitudinal supports are attached to one of a pair of front angular supports. The front angular supports are also attached to each other and have a central folding portion and are foldably attached to the longitudinal support frames to the main central frame.

There is a plurality of path lights provided on the front of the main central frame for lighting a user's current travel path and a forward bottom light provided on the bottom facing surface of the main front base and a rearward bottom light provided on the rearward facing surface of each of a pair of rear support legs. The forward bottom light and the rearward bottom lights provide lighting of the surrounding floor or grade as the user approaches the WVAI for use to avoid trips and falls. The forward bottom light and the rearward bottom lights are controlled by a light control switch located on one of the support arms or through use of a voice-activated control circuit using a microphone.

The WVAI also has a compartment which is provided to hold eyeglasses, remote controls, wireless phones, mobile telephones, and other personal effects is located on a rearward facing surface of the main central frame. Additionally, there is a handle attached to the outer facing surface of the compartment, the handle opens and closes the compartment.

An electronic charging port is provided to charge personal electronics that includes a plurality of mobile telephones from an internal battery of the WVAI and a device charging jack provided for recharging the onboard battery of the WVAI, when the WVAI is not in use. Each of the rear wheels on a foot is provided with a locking brake pivotally attached to the foot and is frictionally engaging the respective rear wheel.

The duress pushbutton is a stand-alone emergency alert system configured to summon assistance should aid be required to provide increased safety for the user. Each of the rear support legs is configured rotate along a first collapsing rotational path in relation to the respective support arm, while each the support arm rotates along a second collapsing rotational path in relation to the main central frame to aid in transporting the WVAI in a motor vehicle or for purposes of storage.

The WVAI may also be provided with an ergonomic hand grip. Each rear hanging rod has a first end hung from an upper bearing pin, which is attached to an inward facing surface of a respective support arm and a second end attached to a respective distal end of the lateral support. Each of the rear hanging rods are adjustable in length and the seat base is adjustable along a travel path to account for users of different sizes.

The seat base and the memory foam pad may be removable. The compartment may be a wedge-shaped device having a perimeter wall with a divider to store the personal items therein. The wedge-shaped compartment may be pivotally attached at the bottom end to an inner facing wall of the main central frame and when closed, and thereby extends into a hollow portion of the main central frame.

Incoming electrical power may be provided at the device charging jack whereupon it is routed to a charge control regulating circuit which supplies regulated charging current to an internal rechargeable battery. During use the electrical power from the internal rechargeable battery is returned to a charge control regulating circuit whereupon it is made available for other electrical components of the WVAI. The electric power may be routed to a personal electronics charge control circuit to provide lower voltage to the electronics charging port. The electrical power may also be routed in a parallel manner to a voice control circuit, which receives control signals from either the light control switch or the microphone, and subsequently applies the electrical power to the path lights, the forward bottom lights and the rearward bottom lights.

The electrical power may also be applied to the duress signaling circuit which receives an input signal from the duress pushbutton. The electrical power is also applied to the step counting circuit which receives an input signal from the step counter reset button and routes an output signal to the step counter display. Additionally, the electrical power may be routed to a digital clock control circuit which receives input signals from the digital clock set switches and routes output signals to the digital clock display.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 walker with voice-activated illumination
15 main central frame
20 support arm
25 main front base
30 rear support leg
35a front wheel
35b rear wheel
40 locking brake
41 foot
45 ergonomic hand grip
50 seat base
55a lateral support
55b longitudinal support
60 memory foam pad with cover
65 front light
70 forward path light
75 rearward back light
80 light control switch
85 microphone/voice activation audio device
90 cup holder
95 double-divided compartment
96 compartment handle
100 personal electronics device charging port
105 device charging jack
110 step counter display
115 step counter reset button
120 duress pushbutton
125 digital clock display
130 digital clock set switch
135 front angular support
140 rear hanging rod
145 upper bearing pin
150 seat adjusting travel path
155 main central frame adjusting travel path
160 first spring pin adjustable rod
165 first release pushbutton
170 rear support legs adjusting travel path
175 second spring pin adjustable rod
180 second release pushbutton
185 third spring pin adjustable rod
190 third release pushbutton
195 support arm adjusting travel path
200 first collapsing rotational path
205 second collapsing rotational path
210 charge control regulating circuit
212 internal rechargeable battery
215 personal electronics charge control circuit
220 voice control circuit
225 duress signaling circuit
230 step counting circuit
235 digital clock control circuit
237 grip brake assembly
240 grip brake handle actuator
245 grip brake cable
250 grip brake wheel actuator

DESCRIPTION OF THE PREFERRED EMBODIMENTS

The best mode for carrying out the invention is presented in terms of its preferred embodiment, herein depicted within FIGS. 1 through 7. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 1:
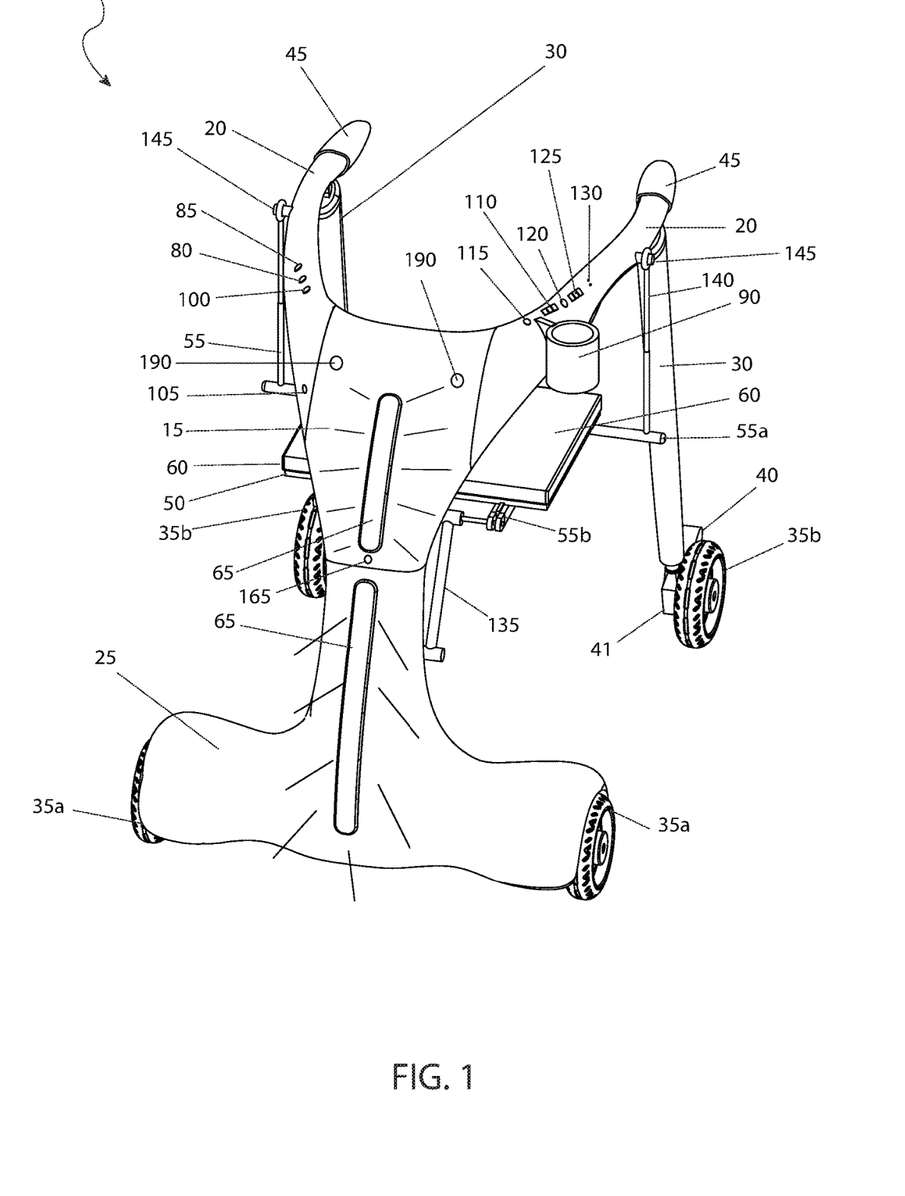
FIG. 1 is a front perspective view of the WVAI 10, according to the preferred embodiment of the present invention.
Figure 3:
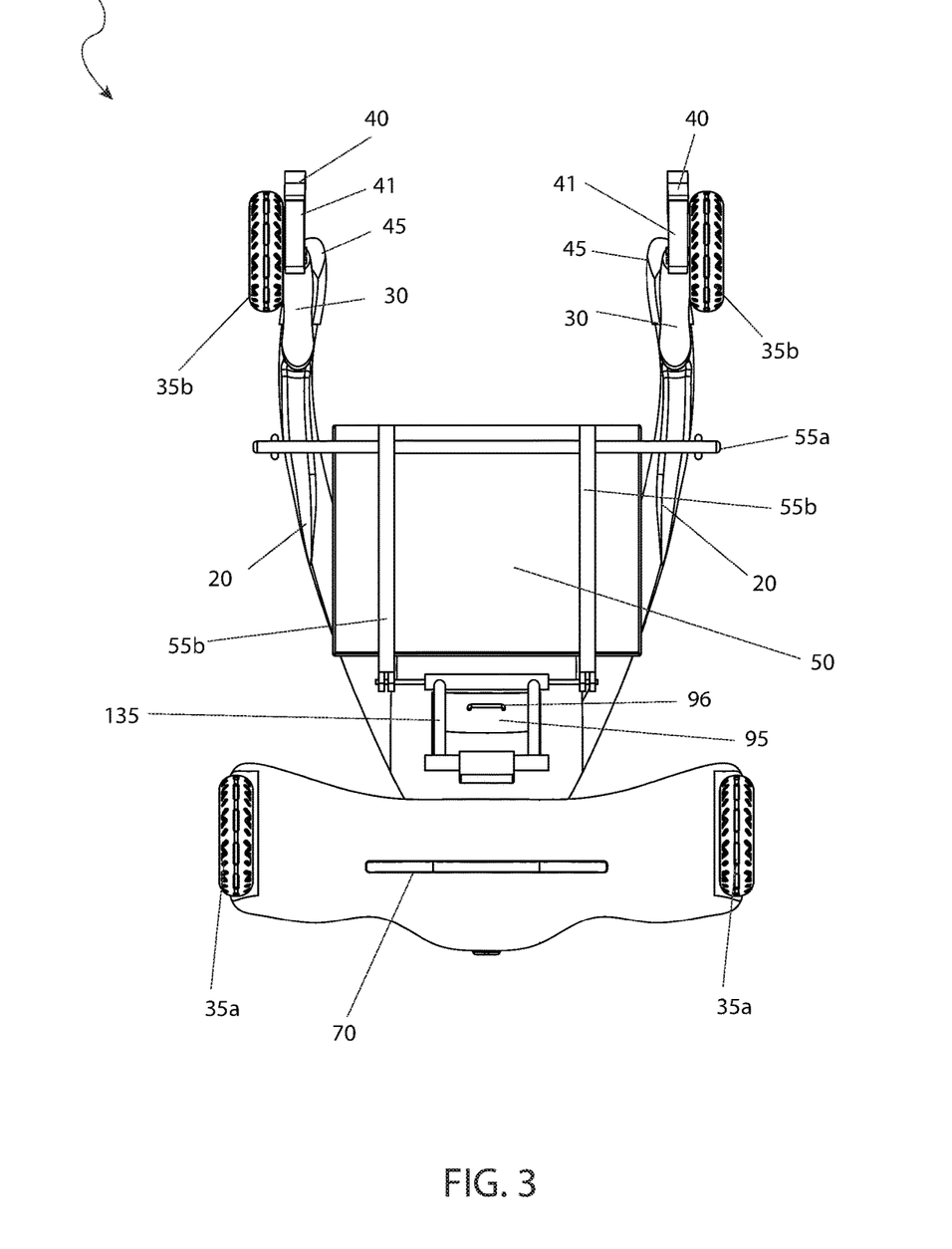
FIG. 3 is a bottom view of the WVAI 10, according to the preferred embodiment of the present invention.

Referring now to FIGS. 1 and 3, a front perspective view and a bottom view of the WVAI 10, according to the preferred embodiment of the present invention is disclosed. The WVAI 10, includes a main central frame 15 with two (2) rearwardly-projecting support arms 20. The main central frame 15 is provided with a main front base 25 while the two (2) support arms 20 are each provided with an independent rear support leg 30. The main front base 25 is provided with two (2) front wheels 35a, while each of the rear support legs 30 is attached to a foot 41 that is provided with a respective rear wheel 35b for a total of four (4) wheels (two (2) front wheels 35a and two (2) rear wheels 35b) for the WVAI 10. Each of the rear wheels 35b on a foot 41 is provided with a locking brake 40 (only one (1) locking brake 40 is depicted in FIG. 1, due to illustrative limitations). As such, the locking brake 40 is pivotally attached to the foot 41 and is capable of frictionally engaging the respective rear wheel 35b.

The distal end of each support arm 20 is provided with an ergonomic hand grip 45. A seat base 50 is supported via the main central frame 15 and the support arms 20 via a folding support system, which includes a lateral support 55a along and attached to a bottom surface adjacent a rearward perimeter edge of the seat base 50, and a pair of longitudinal supports 55b parallel with each other and attached to a bottom surface adjacent to perimeter side edges of the seat base 50. The longitudinal supports 55b have a first end, each attached to the lateral support 55a and a second end. The second ends of the longitudinal supports 55b are attached to one (1) of a pair of front angular supports 135. The front angular supports 135 are attached to each other, have a central folding portion, and foldably attach the longitudinal support frames 55b to the main central frame 15. A memory foam pad with cover 60 is provided atop the seat base 50 for enhanced user comfort. The aforementioned cover may comprise leather.

Front lights 65 are provided on the front of the main central frame 15 for lighting the user's current travel path in dark rooms or while outside at night. Additionally, a forward path light 70 is provided on the bottom facing surface of the main front base 25 (best seen in FIG. 3), and a rearward back light 75 is provided on the rearward facing surface of each rear support leg 30 (one (1) per rear support leg 30, total of two (2)). The forward path light 70 and the rearward back lights 75 provide lighting of the surrounding floor or grade as the user approaches the WVAI 10 for use to avoid trips and falls.

The forward path light 70 and the rearward back lights 75 are controlled by a light control switch 80 located on one (1) of the support arms 20 or using a voice-activated control circuit 220 using a microphone/voice activation audio device 85. The voice activated control is contemplated to be the primary means by which the WVAI 10 is actuated. It is further contemplated that the voice activated control will be responsive at a distance greater than 15 feet. The voice-activated control circuit 220 will be described in greater detail herein below. A double-divided compartment 95 (best seen in FIG. 3) is provided to hold eyeglasses, remote controls, wireless phones, mobile telephones, and other personal effects and is located on a rearward facing surface of the main central frame 15. A handle 96 is attached to the outer facing surface of the double-divided compartment 95 and opens and closes the double-divided compartment 95. The double-divided compartment 95 is a wedge-shaped device having a perimeter wall with dividers to store the personal items therein. The wedge-shaped double-divided compartment 95 is pivotally attached at the bottom end to an inner facing wall of the main central frame 15 and when closed, extends into a hollow portion of the main central frame 15. A personal electronics device charging port 100 is provided to charge personal electronics such as mobile telephones from the internal battery of the WVAI 10 as will be described in greater detail herein below. A device charging jack 105 is provided for recharging the onboard battery of the WVAI 10, when the WVAI 10 is not in use, such as overnight.

Located on the opposing one (1) of the support arms 20 from the personal electronics device charging port 100, light control switch 80, and microphone/voice activation audio device 85, is a cup holder 90 to hold beverage cups, water bottles or similar cylindrical containers. Also located on this same support arm 20 is a step counter display 110, a step counter reset button 115, a duress pushbutton 120, a digital clock display 125, and digital clock set switches 130. The step counter display 110 is sued to count steps of the user while enlisting the aid of the WVAI 10. The duress pushbutton 120 is a stand-alone emergency alert system, such as "Life-Alert" ® (but not limited to) to summon assistance should aid be required. The incorporation of the duress pushbutton 120 within the WVAI 10 is to provide increased safety for the user. The particular type or style as well as any particular claims within the duress pushbutton 120 is not intended to be a limiting factor of the present invention. The digital clock display 125 and associated digital clock set switches 130 are intended for user convenience should other time indicating devices not be readily available. Each rear hanging rod 140 has a first end hung from an upper bearing pin 145.

Figure 2:
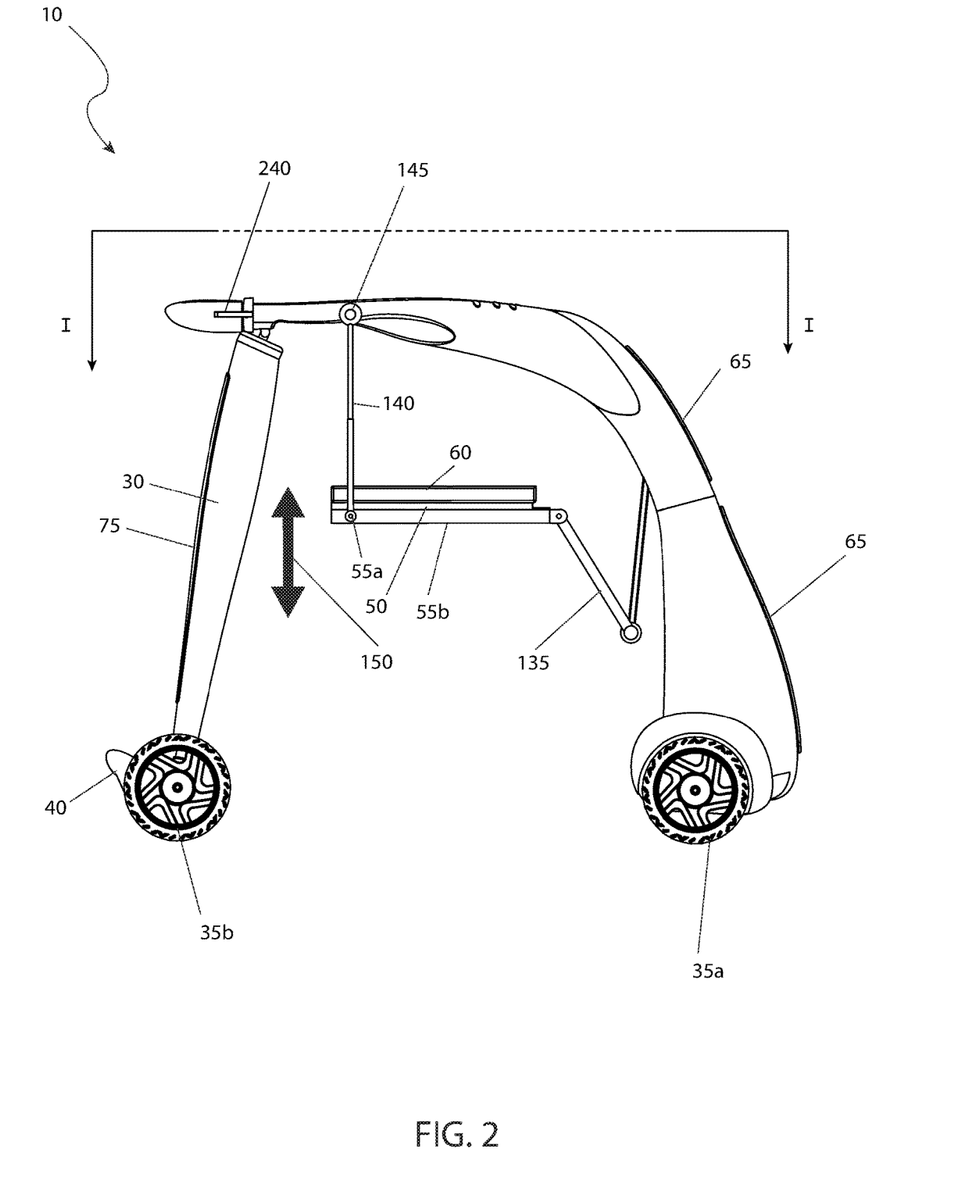
FIG. 2 is a side view of the WVAI 10, according to the preferred embodiment of the present invention.

Referring next to FIG. 2, a side view of the WVAI 10, according to the preferred embodiment of the present invention is depicted. This view more clearly depicts the front wheels 35a, rear wheels 35b, the front lights 65, one (1) of the rearward back lights 75, the locking brake 40, one (1) of the rear support legs 30 and a grip brake handle actuator 240. The seat base 50 and associated memory foam pad with cover 60 are adjustable in nature with respect to seating height position and are supported by two (2) front angular supports 135 (only one (1) of which is depicted due to illustrative limitations) and two (2) rear hanging rods 140 (only one (1) of which is depicted due to illustrative limitations). As noted above, each rear hanging rod 140 has a first end hung from an upper bearing pin 145, which is attached to an inward facing surface of a respective support arm 20 and a second end attached to a respective distal end of the lateral support 55a. Each rear hanging rod 140 is adjustable in length. As such, the seat base 50 is adjustable along a seat adjusting travel path 150 to account for users of different sizes.

Figure 4:
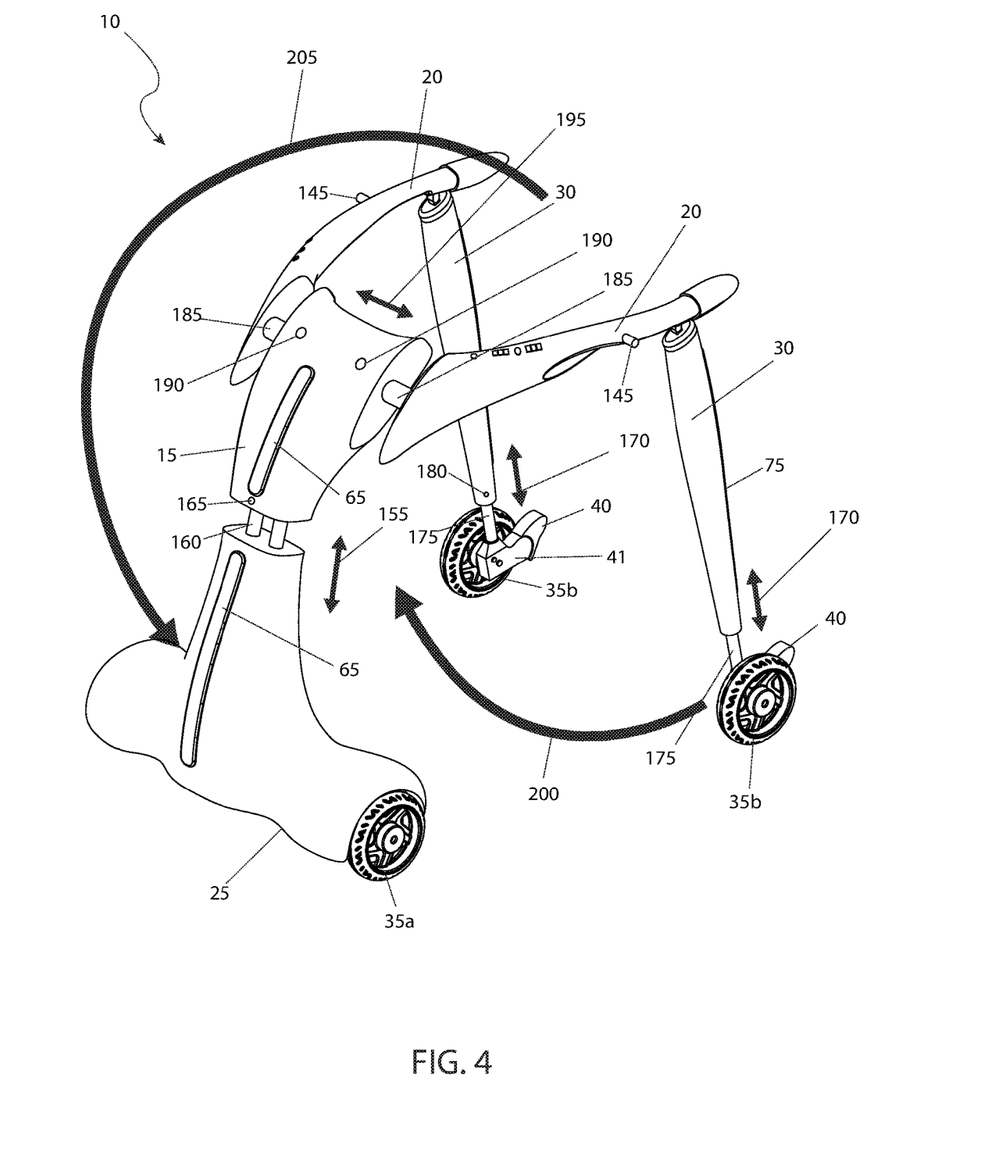
FIG. 4 is a perspective view of the WVAI 10, depicting the variable size feature of the present invention, according to the preferred embodiment of the present invention.

Referring now to FIG. 4, a perspective view of the WVAI 10, depicting the variable size feature of the present invention, according to the preferred embodiment of the present invention is shown. This view provides further clarification on height and width adjustment features of the WVAI 10. First, the main central frame 15 is adjustable along a main central frame adjusting travel path 155 through the use of first spring pin adjustable rods 160 through the use of a first release pushbutton 165. In a similar manner, the height of the two (2) rear support legs 30 with respect to the respective foot 41 are adjustable along a rear support legs adjusting travel path 170 through the use of two (2) second spring pin adjustable rods 175 controlled by the use of two (2) second release pushbuttons 180 (only one (1) of which is depicted due to illustrative limitations). Thus, as can be seen by those skilled in the art, the first spring pin adjustable rods 160 and second spring pin adjustable rods 175 allow for users of varying height to use the WVAI 10 with ease. To accommodate users of different widths, the upper portion of the main central frame 15 is provided with two (2) third spring pin adjustable rods 185, each controlled by a respective third release pushbutton 190 to provide for travel of each support arm 20 along a support arm adjusting travel path 195.

To aid in transporting the WVAI 10 in a motor vehicle or for purposes of storage, the WVAI 10 collapses to a reduced volume. Each rear support leg 30 rotates along a first collapsing rotational path 200 in relation to the respective support arm 20, while each support arm 20 rotates along a second collapsing rotational path 205 in relation to the main central frame 15. Further information on the collapsed state of the WVAI 10 will be provided herein below. It is noted that the seat base 50 (as shown in FIG. 1), the memory foam pad with cover 60 (as shown in FIG. 1), and the folding support system 55 (as shown in FIG. 1) are not shown in FIG. 4 for purposes of clarity but may or may not be removed for purposes of collapsing and subsequent storage and/or transport.

Figure 5:
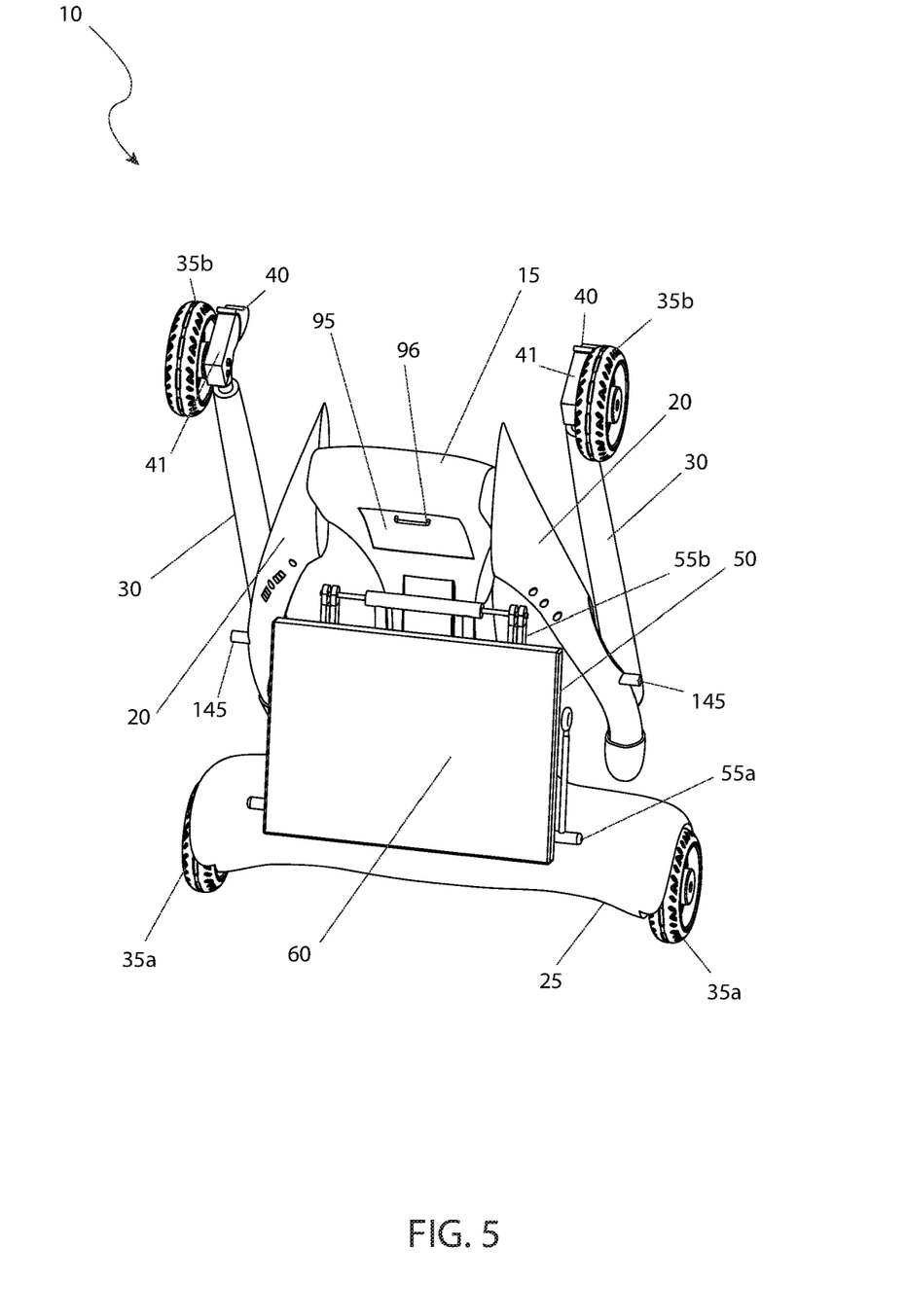
FIG. 5 is a perspective view of the WVAI 10, shown in a collapsed state for storage, according to the preferred embodiment of the present invention.

Referring next to FIG. 5, a perspective view of the WVAI 10, shown in a collapsed state for storage, according to the preferred embodiment of the present invention is disclosed. This view provides additional clarification on the reduced overall space volume occupied by the WVAI 10 in a collapsed state. It is noted that the rear support legs 30 are in close proximity to the support arms 20 and the support arms 20 are in close proximity to the main central frame 15. Additionally, the seat base 50 and the memory foam pad with cover 60 are in close proximity to the main central frame 15.

Figure 6:
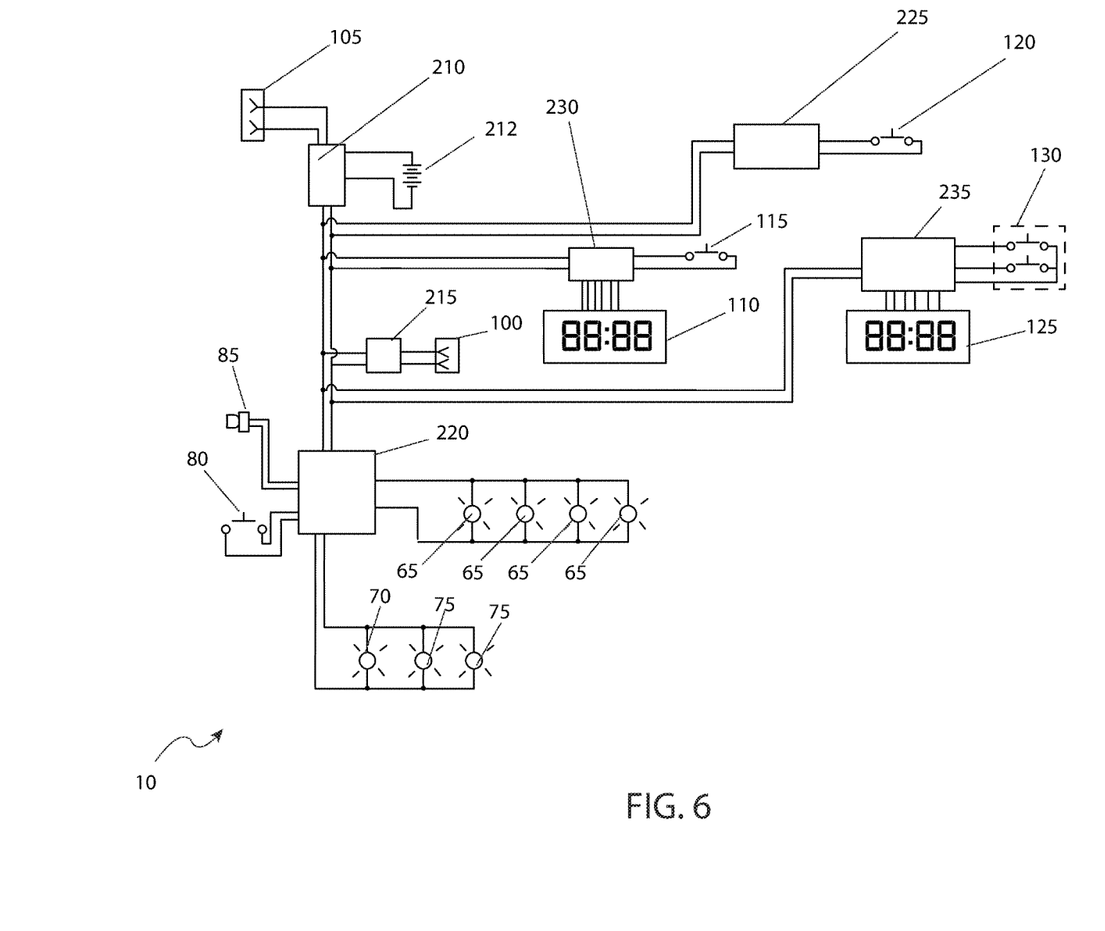
FIG. 6 is an electrical block diagram of the WVAI 10, according to the preferred embodiment of the present invention; and, FIG. 7 is a cross-sectional view of the WVAI 10, taken along line I-I in FIG. 2, showing a grip brake assembly 237, according to a separate embodiment of the present invention.

Referring next to FIG. 6, an electrical block diagram of the WVAI 10, according to the preferred embodiment of the present invention is depicted. Incoming electrical power is provided at the device charging jack 105 whereupon it is routed to a charge control regulating circuit 210 which supplies regulated charging current to an internal rechargeable battery 212. During use, power from the internal rechargeable battery 212 is returned to the charge control regulating circuit 210 whereupon it is made available for other electrical components of the WVAI 10. Power is routed to a personal electronics charge control circuit 215 to provide lower voltage (envisioned to be five volts (5.0 VDC) at two amps (2.0A)) to the personal electronics device charging port 100. Power is also routed in a parallel manner to a voice control circuit 220, which receives control signals from either the light control switch 80 or the microphone/voice activation audio device 85, and subsequently applies electrical power to the front lights 65, the forward path lights 70 and the rearward back lights 75 as shown. Power is also applied to the duress signaling circuit 225 which receives an input signal from the duress pushbutton 120. Power is also applied to the step counting circuit 230 which receives an input signal from the step counter reset button 115 and routes an output signal the step counter display 110. Finally, power is routed to a digital clock control circuit 235 which receives input signals from the digital clock set switches 130 and routes output signals to the digital clock display 125.

Figure 7:
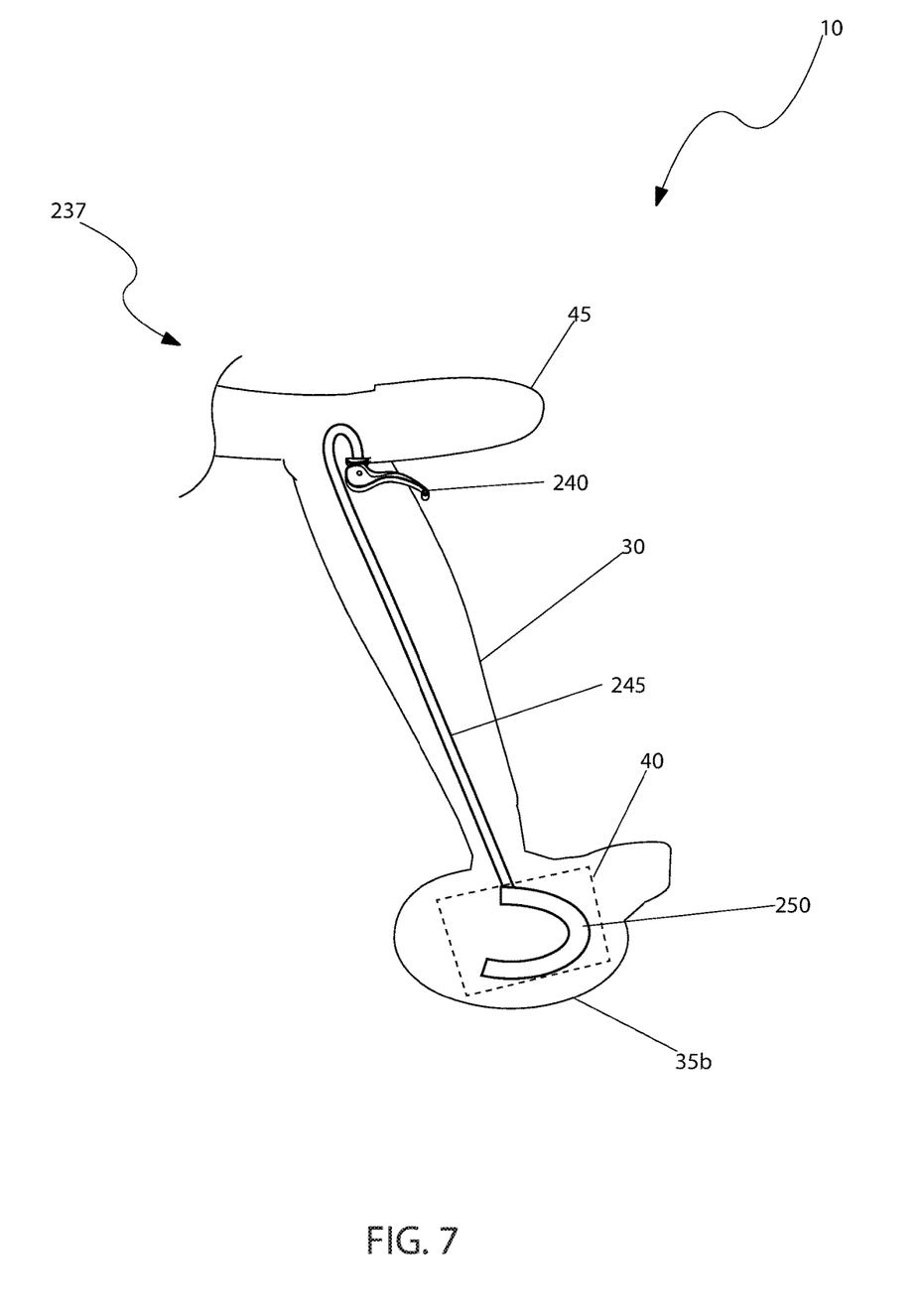

Referring finally to FIG. 7, a cross-sectional view of the WVAI 10, taken along line I-I in FIG. 2, showing a grip brake assembly 237, according to a separate embodiment of the present invention, is disclosed. This separate embodiment 10 comprises a grip brake assembly 237 having a grip brake handle actuator 240, a brake cable 245 and a grip brake wheel actuator 250. The grip brake assembly 237 is designed to secure a braking mechanism for the WVAI 10. Specifically, the grip brake handle actuator 240 is secured adjacent the ergonomic hand grip 45. The ergonomic hand grip 45 is configured to permit a first force upon the grip brake handle actuator 240—which in turn exerts a second force upon the grip brake cable 245—which is secured within the rear leg support 30. The second force acts upon the grip brake wheel actuator 250, secured within the locking brake 40, generating a third force which secures the rear wheel 35b in a fixed position. Upon the release of the first force, the rear wheel 35b is free to rotate.

It is envisioned that the WVAI 10 could be outfitted with a pair of grip brake assemblies 237, each being disposed adjacent a respective right and left hand grip 45 with each grip brake assembly 237 being respectively configured to secure a right and left rear wheel 35b.

2. Operation of the Preferred Embodiment

The preferred embodiment of the present invention can be utilized by the common user with little or no training. It is envisioned that the WVAI 10 would be constructed in general accordance with FIG. 1 through FIG. 5. The user would procure the WVAI 10 through conventional home health care device procurement channels. Particular attention would be paid to accessories, color, style and the like.

After procurement and prior to utilization, the WVAI 10 would be prepared in the following manner: the support arms 20 would be unfolded from the main central frame 15; the rear support legs 30 would be unfolded from the support arms 20; height adjustment for the intended user (i.e. the relative distance of the main central frame 15 from the main front base 25) would be made by manipulation of the first release pushbutton 165 and corresponding first spring pin adjustable rods 160, the second spring pin adjustable rods 175 and corresponding second release pushbuttons 180 (i.e. the relative distance from a rear support leg 30 from a rear foot 41), width adjustment for the intended user would be made by manipulation of the third spring pin adjustable rods 185 and corresponding third release pushbuttons 190 (i.e. the relative distance of the main central frame 15 from a respective support arm 20); the internal rechargeable battery 212 would be charged through the device charging jack 105; and any personal items stored in the double-divided compartment 95 and/or cup holder 90.

During utilization of the WVAI 10, the following procedure would be initiated: user would propel the WVAI 10 by placement of their hands upon the ergonomic hand grip 45 and move forward in a steadying manner; the user could sit upon the seat base 50 and memory foam pad with cover 60; personal items could be accessed from the cup holder 90 or double-divided compartment 95; steps counted upon the step counter display 110; current time could be accessed from the digital clock display 125; emergency help could be summoned by pressing the duress pushbutton 120; local area lighting from the front lights 65, the forward path light 70 and the rearward back lights 75 could be activated by pressing the light control switch 80 or by saying "ELKY" into the microphone/voice activation audio device 85; personal electronics could be charged through the personal electronics device charging port 100; and/or the rear wheels 35b could be activated by manipulation of the locking brake(s) 40.

After use of the WVAI 10, it is simply left alone in a handy location where it can be used again in a repeating manner; the local area lighting from the front lights 65, the forward path light 70 and the rearward back lights 75 could be de-activated by pressing the light control switch 80 or by saying "ELKY-off" into the microphone/voice activation audio device 85; and any personal items could be accessed from the cup holder 90 or double-divided compartment 95 for related tasks.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A walker, comprising:
   an adjustable main central frame having a pair of rearwardly-projecting support arms, said main central frame provided with a main front base while said pair of support arms each have a rear support leg, said main front base having a pair of front wheels, each of said rear support legs is adjustably attached to a foot with a respective rear wheel;
   wherein said main central frame is adjustable along a main central frame adjusting travel path through use of a plurality of first spring pin adjustable rods through use of a first switch;
   wherein said two rear support legs with respect to said foot are adjustable along a rear support legs adjusting travel path through use of two second spring pin adjustable rods controlled by two second switches, an upper portion of said main central frame is provided with a pair of two third spring pin adjustable rods, each controlled by a respective third switch to provide for travel of each said support arm along a support arm adjusting travel path;
   wherein located on an opposing one of said support arms from a light control switch, and a microphone is a cup holder;
   wherein located on other said support arm is a step counter display, a step counter reset switch, a duress switch, a digital clock display, and a plurality of digital clock set switches;
   a seat base foldably supported to said main central frame and said support arms via a folding support system;
   a memory foam pad provided atop said seat base;
   wherein said seat base and said memory foam pad are adjustable in nature with respect to seating height position and are supported by a pair of front angular supports and a pair of rear hanging rods;
   a pair of longitudinal supports parallel with each other and attached to a bottom surface adjacent to perimeter side edges of said seat base;
   a plurality of path lights provided on said front of said main central frame capable of lighting said main central frame adjusting travel path of said walker; a forward bottom light provided on said bottom facing surface of said main front base and a rearward bottom light provided on said rearward facing surface of each of a pair of rear support legs;
   a compartment located on a rearward facing surface of said main central frame;
   a handle attached to said outer facing surface of said compartment;
   an electronic device charging port configured to provide electrical communication between personal electronics and an internal battery of said walker; and,
   a device charging jack configured to provide electrical communication between said battery and said power supply.

2. The walker according to claim 1, wherein said duress switch is a stand-alone emergency alert system to summon assistance should aid be required to provide increased safety for said user.

3. The walker according to claim 1, wherein each said rear support leg rotates along a first collapsing rotational path in relation to said respective support arm, while each said support arm rotates along a second collapsing rotational path in relation to said main central frame to aid in transporting said walker in a motor vehicle or for purposes of storage.

4. The walker according to claim 1, further comprising a distal end of each support arm is provided with an ergonomic hand grip.

5. The walker according to claim 1, wherein each said rear hanging rod has a first end hung from an upper bearing pin, which is attached to an inward facing surface of a respective support arm and a second end attached to a respective distal end of said lateral support.

6. The walker according to claim 5, wherein each said rear hanging rod is adjustable in length and said seat base is adjustable along a seat adjusting travel path to account for users of different sizes.

7. The walker according to claim 1, wherein said seat base and said memory foam pad are removable.

8. The walker according to claim 1, wherein said compartment is a wedge-shaped device having a perimeter wall with dividers to store said personal items therein.

9. The walker according to claim 8, wherein said wedge-shaped compartment is pivotally attached at said bottom end to an inner facing wall of said main central frame and when closed, extends into a hollow portion of said main central frame.

10. The walker according to claim 1, wherein incoming electrical power is provided at said device charging jack whereupon it is routed to a charge control regulating circuit which supplies regulated charging current to an internal rechargeable battery.

11. The walker according to claim 10, wherein during use said electrical power from said internal rechargeable battery is returned to a charge control regulating circuit whereupon it is made available for other electrical components of said walker.

12. The walker according to claim 1, wherein said electric power is routed to a personal electronic device charge control circuit to provide lower voltage to said electronics charging port.

13. The walker according to claim 1, wherein said electrical power is also routed in a parallel manner to a voice control circuit, which receives control signals from either said light control switch or said microphone, and subsequently applies said electrical power to said path lights, said forward bottom lights and said rearward bottom lights.

14. The walker according to claim 1, wherein said electrical power is also applied to said duress signaling circuit which receives an input signal from said duress pushbutton.

15. The walker according to claim 1, wherein said electrical power is also applied to said step counting circuit which receives an input signal from said step counter reset button and routes an output signal to said step counter display.

16. The walker according to claim 1, wherein said electrical power is routed to a digital clock control circuit which receives input signals from said digital clock set switches and routes output signals to said digital clock display.

17. The walker according to claim 1, wherein said seat base includes a lateral support along and attached to a bottom surface adjacent a rearward perimeter edge of said seat base.

18. The walker according to claim 1, wherein said pair of longitudinal supports have a first end each attached to said lateral support and a second end, said second ends of said longitudinal supports are attached to one of a pair of front angular supports, said front angular supports are attached to each other and have a central folding portion, and foldably attach said longitudinal support frames to said main central frame.

19. The walker according to claim 1, wherein said forward bottom light and said rearward bottom lights provide lighting of said surrounding floor or grade as said user approaches said walker, said forward bottom light and said rearward bottom lights are controlled by a light control switch located on one of said support arms or through use of a voice-activated control circuit using a microphone.

20. The walker of according to claim 1, wherein each of said rear wheels on a foot is provided with a locking brake pivotally attached to said foot and is frictionally engaging said respective rear wheel.

\* \* \* \* \*